(12) United States Patent
Feeser

(10) Patent No.: US 10,489,196 B1
(45) Date of Patent: *Nov. 26, 2019

(54) JOB SCHEDULER FOR REMOTE MAINTENANCE OF SERVERS AND WORKSTATIONS

(71) Applicant: OPEN INVENTION NETWORK LLC, Durham, NC (US)

(72) Inventor: Colin Lee Feeser, Atlanta, GA (US)

(73) Assignee: OPEN INVENTION NETWORK LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/114,649

(22) Filed: Aug. 28, 2018

Related U.S. Application Data

(63) Continuation of application No. 15/471,143, filed on Mar. 28, 2017, now Pat. No. 10,061,612, which is a continuation of application No. 15/051,499, filed on Feb. 23, 2016, now Pat. No. 9,606,832, which is a continuation of application No. 14/698,291, filed on Apr. 28, 2015, now Pat. No. 9,268,616, which is a continuation of application No. 14/274,957, filed on May 12, 2014, now Pat. No. 9,032,409, which is a continuation of application No. 11/414,874, filed on May 1, 2006, now Pat. No. 8,726,282.

(51) Int. Cl.
| | |
|---|---|
| G06F 9/46 | (2006.01) |
| G06F 9/48 | (2006.01) |
| H04L 29/08 | (2006.01) |
| G06F 9/50 | (2006.01) |

(52) U.S. Cl.
CPC .......... *G06F 9/4881* (2013.01); *G06F 9/4843* (2013.01); *G06F 9/5088* (2013.01); *H04L 67/1002* (2013.01); *G06F 2209/486* (2013.01); *G06F 2209/5017* (2013.01)

(58) Field of Classification Search
None
See application file for complete search history.

*Primary Examiner* — Gregory A Kessler

(57) ABSTRACT

A method, system and program product for remote scheduling of at least one job to run on a plurality of computers in a computer network. The job scheduler enables selection of a domain that includes at least a subset of the computers on which the job is to run. A list of computers in the selected domain is automatically generated. The computers on which the job is to run can be selected from the generated list of computers. A configuration file is created for storing an identification of the selected domain and the job to be run on the selected computers in the domain.

27 Claims, 19 Drawing Sheets

```
[Domains]
Domain0=SOUTHERNCO
Domain1=BATUSERS

[Credentials]
UserID=8xIrs6blkoIRlicifsuL6vxtdu/Q7+/5hEPyCbxCO44=
Password=t/qhtY19j7wroK/8EU2d2g==

*[Credentials]
*UserID=8xIrs6blkoIRlicifsuL6vxtdu/Q7+/5hEPyCbxCO44=
*Password=t/qhtY19j7wroK/8EU2d2g==

[DISABLENETIQ]
CopyFrom=E:\srvapps\Jobscheduler.Net\Job Files\DisableNetIQ\DisableNetIQ.exe
CopyTo=c$\netiq\disablenetiq
System Account=True
CommandLine=c:\netiq\disablenetiq\disablenetiq.exe
Parameters=
Selectwhen=One time only
Date=5/11/2005
Hour=11
Minute=0

[SAVEFILESHARES]
CopyFrom=E:\srvapps\Jobscheduler.Net\Job Files\SaveFileshares\SaveFileshares.exe
CopyTo=c$\srvcust\tools\savefileshares
System Account=False
CommandLine=c:\srvcust\tools\savefileshares\savefileshares.exe
Parameters=
Selectwhen=weekly
Sunday=true
Interval=1
Hour=21
Minute=30

[PRINTER QUEUE BACKUP]
CopyFrom=E:\srvapps\Jobscheduler.Net\Job Files\*.*
CopyTo=c$\srvcust\tools\printertools
System Account=False
CommandLine=c:\srvcust\tools\printertools\printertools.exe
Parameters=-backup ""
```

Fig. 3

JOB SCHEDULER FOR REMOTE MAINTENANCE OF SERVERS AND WORKSTATIONS

CROSS-REFERENCE TO RELATED APPLICATION

This application is a continuation of U.S. patent application Ser. No. 15/471,143, filed Mar. 28, 2017, entitled JOB SCHEDULER FOR REMOTE MAINTENANCE OF SERVERS AND WORKSTATIONS, now issued as U.S. Pat. No. 10,061,612, issued Aug. 28, 2018, which is a continuation of U.S. patent application Ser. No. 15/051,499, filed Feb. 23, 2016, entitled JOB SCHEDULER FOR REMOTE MAINTENANCE OF SERVERS AND WORKSTATIONS, issued U.S. Pat. No. 9,606,832, issued Mar. 28, 2017, which is a continuation of U.S. patent application Ser. No. 14/698,291, filed Apr. 28, 2015, entitled JOB SCHEDULER FOR REMOTE MAINTENANCE OF SERVERS AND WORKSTATIONS, issued U.S. Pat. No. 9,268,616, issued Feb. 23, 2016, which is a continuation of U.S. patent application Ser. No. 14/274,957, filed May 12, 2014, entitled JOB SCHEDULER FOR REMOTE MAINTENANCE OF SERVERS AND WORKSTATIONS, issued U.S. Pat. No. 9,032,409, issued May 12, 2015, which is a continuation of U.S. patent application Ser. No. 11/414,874, filed May 1, 2006, entitled JOB SCHEDULER FOR REMOTE MAINTENANCE OF SERVERS AND WORKSTATIONS, issued U.S. Pat. No. 8,726,282, issued May 13, 2014, which are incorporated by reference herein in their entirety.

BACKGROUND OF THE INVENTION

The present invention relates generally to scheduling tasks for execution on a plurality of computers in a wide area network and, more particularly, to remote scheduling of tasks for execution on servers and workstations in the network.

In a large enterprise with many thousands of file servers and workstations, the conventional methods of running maintenance software on remote computers in a wide area network have proven to be very inefficient. Every Windows-based machine has a built in tool called the task scheduler. Scheduled tasks are created and executed based on standard security permissions. The task scheduler is fully integrated into the operating system. The task scheduler is useful for scheduling a task to run at a certain time on a machine in a Windows-based computing environment when the machine is not being utilized or when it doesn't interfere with production. However, this approach only works if the administrator can get to the server or workstation to configure the task.

There is a need for a method for remotely placing tasks (jobs) in the task schedulers of multiple workstations in the network simultaneously. The task scheduler on each server or workstation then runs the actual job at the assigned time or when a certain event occurs.

SUMMARY OF THE INVENTION

The present invention is directed to a job scheduler that not only can perform all of the customized configurations of the task scheduler on an operating system platform, but can do so for thousands of machines at a time. The job scheduler can read every machine on a selected domain or just certain types of machines and allow the user to set a scheduled task on as many machines as the user selects, or on all of the machines in the network that are not excluded. A domain is a single security boundary of a Windows-based computer network. Every domain has its own security policies and security relationships with other domains in the Active Directory. The present invention allows the user to configure a job to run at a certain time and then export the configuration to the task scheduler of as many machines as the user selects from the automatically generated list. This list is pulled from the Active Directory of the network domain selected. It can also be configured to only show specific types of machines such as print server, mail servers, domain controllers, file servers, infrastructure servers, or application servers. It can also be configured to only show only Windows 2000 or 2003 servers. The job scheduler of the invention can be configured to run the jobs either using a special network ID or using the system account.

In one aspect of the invention, a method is provided for remote scheduling of at least one job to run on a plurality of computers in a computer network. The method begins by selecting a domain that includes at least a subset of the computers on which the job is to run. A list of computers in the selected domain is automatically generated. The computers on which the job is to run are selected from the generated list of computers. A configuration file is created for storing an identification of the selected domain and the job to be run on the selected computers. Next, a determination is made whether or not the job already exists in a task scheduler on each of the selected computers. If the job already exists on any selected computer, it is removed from the task scheduler on that computer. The configuration file identifying the selected domain and job to be run is transmitted to the task scheduler of each selected computer in the domain.

In another aspect of the invention, a computer program product is provided for remote scheduling of a job to run on a plurality of computers in a computer network comprising a computer readable medium having embedded computer readable code. The computer readable medium includes: (i) program instructions that enable selection of a domain that includes at least a subset of the computers on which the job is to run; (ii) program instructions that automatically generate a list of computers in the selected domain; (iii) program instructions that enable selection of the computers from the generated list of computers on which the job is to run; (iv) program instructions that enable creation of a configuration file for storing an identification of the selected domain and the job to be run on the selected computers; and (v) program instructions that transmit the configuration file to the task scheduler of each selected computer for installation and execution of the job.

In yet another aspect of the invention, a job scheduler system is provided for remote scheduling of a job to run on a plurality of computers in a computer network. The job scheduler system has a plurality of components. A first component enables selection of a domain that includes at least a subset of the computers on which the job is to run. A second component automatically generates a list of computers in the selected domain. A third component enables selection of the computers from the generated list of computers on which the job is to run. A fourth component enables creation of a configuration file for storing an identification of the selected domain and the job to be run on the selected computers. A fifth component transmits the configuration file to the task scheduler of each selected computer for installation and execution of the job.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 3 illustrates an exemplary configuration file for storing a domain list and each job that is scheduled and deployed.

DETAILED DESCRIPTION OF THE INVENTION

Figure 1:
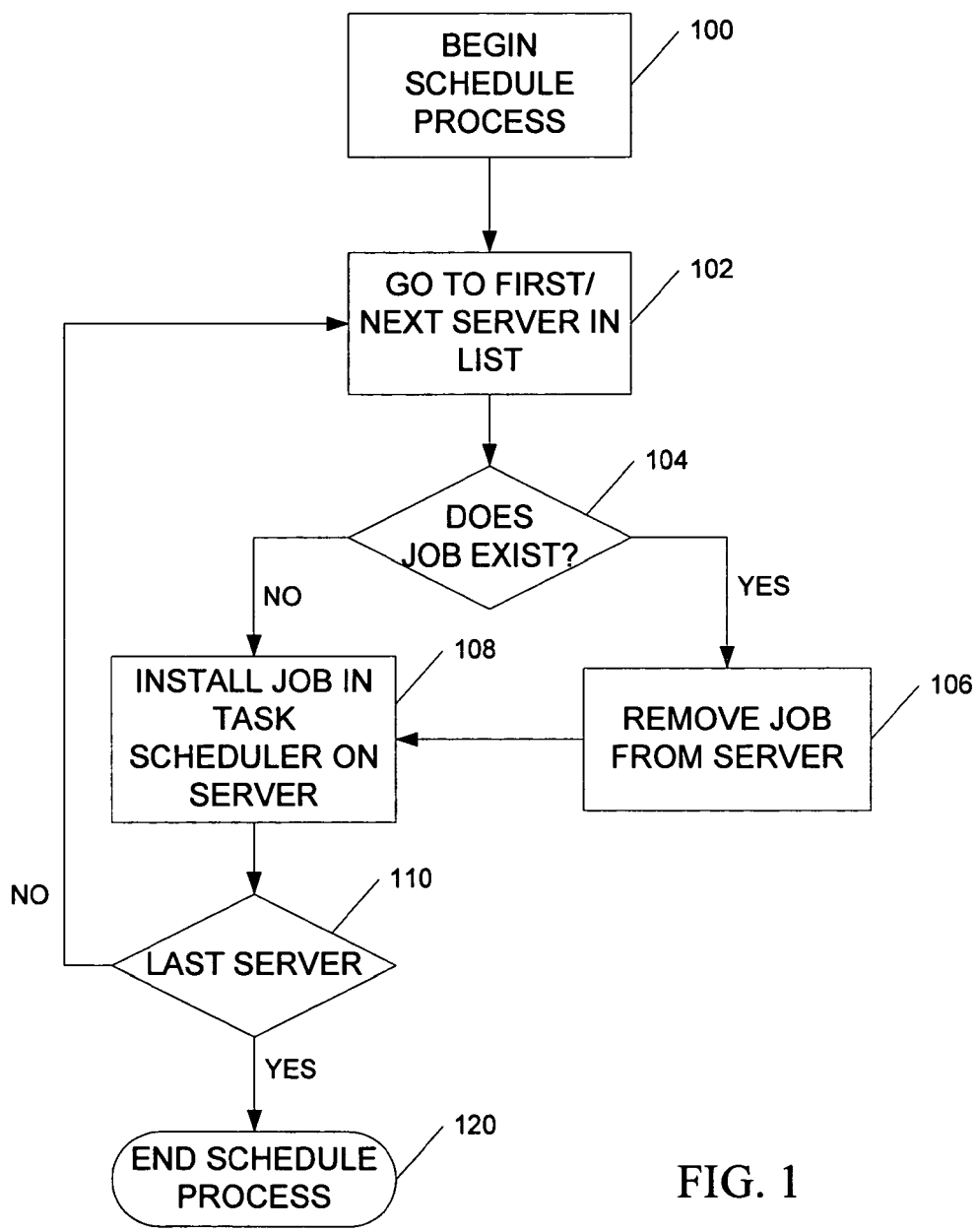
FIG. 1 illustrates processing logic for the job scheduler utility in accordance with an exemplary embodiment of the invention.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

The exemplary embodiment of the invention is described in terms of the Microsoft .NET framework and the C# high level language. The .NET framework has two main elements: a virtual machine called the Common Language Runtime (CLR) and the Base Class Libraries (BCL). When a program is developed for .NET in a high level language such as C# or VB.NET, the compiler generates Intermediate Language (IL) which is similar to assembly language code. The CLR then takes the code in IL form and converts it to machine code that it executes. The code that is generated is called managed code. The CLR controls all aspects of allocating memory and lifetime of objects. The BCL is a set of classes and functions that enable the programmer to communicate with the operating system and other technologies.

C# is a language derived from C++ by Microsoft for the .NET Framework. C# doesn't use pointers, has single inheritance, does not have macro support, and does not have template support. Single inheritance means that a class can only derive from at most one other class. When a class inherits from another class, it gains all the properties, methods, fields, events, and constructors from the class from which it inherited (i.e., the base class). The class that inherits from the base class is referred to as the derived class.

Most of the BCL classes are written in C#. The other principal language for the .NET Framework is Visual Basic- .NET (VB.NET) that has been modified significantly from Visual Basic to account for the object-oriented features of the BCL. Both C# and VB compile to IL, thus their performance is about the same.

It is important for applications to identify users and control access to resources. Authentication is the act of determining the identity of the requesting user. Typically, the user must present credentials such as a name/password pair in order to be authenticated. Once the authenticated identity is established, the right to access a given resource must be determined.

The job scheduler of the invention is a software-implemented application written in the C# high level programming language and requires the Microsoft .NET framework to be on the machine on which it is running. The job scheduler invention does not require the .NET framework to be on the machines to which it is sending jobs. The job scheduler application is installed by copying two files—the job scheduler executable file "JobScheduler.exe" and the task scheduler dynamic link library (DLL) file "TaskScheduler.dll"- to the machine from which the application will be run. As is well known in the art, a DLL is a library of software modules that can be accessed and executed by other programs. DLL files do not get loaded into random access memory (RAM) until needed by another program. DLL files are dynamically linked with the program that calls them during program execution rather than being compiled with the calling program. In the invention, the task scheduler dynamic link library is accessed and executed by the job scheduler executable file. The job scheduler application utilizes a configuration (.cfg) file that is created on the fly. All settings for the job scheduler application can be made from within the application and then saved to the configuration file. Some of the settings such as the User ID and password are encrypted.

FIG. 1 illustrates a high level overview of the processing logic for the job scheduler utility in an exemplary embodiment of the invention. The job scheduler process begins in logic block 100. The processing logic starts with the first server or workstation in the domain list as indicated in logic block 102. In decision block 104, a test is made to determine if a job having the same name already exists in the task scheduler for the first (or next) server or workstation in the list. If the job already exists, then the job is removed from the task scheduler as indicated in logic block 106. After removing the existing job having the same name (yes path from decision block 104), or if the job does not exist in the task scheduler (no path from decision block 104), the job is installed in the task scheduler on the first (or next) server or workstation as indicated in logic block 108. Next, in decision block 110, a test is made to determine if the last server or workstation in the domain has been checked for the job. If there are additional servers or workstations in the domain to schedule, processing returns to logic block 102 to check the next server or workstation on the list. If there are no additional servers or workstations in the domain to schedule, processing ends as indicated in termination block 120. The same process applies to servers or workstations in any other domain selected for job scheduling.

Very little setup is required to use the job scheduler initially. Except for a list of the domains the user plans to use and creating a User ID and password from which to run the jobs, everything else is built into the job scheduler.

Figure 2A:
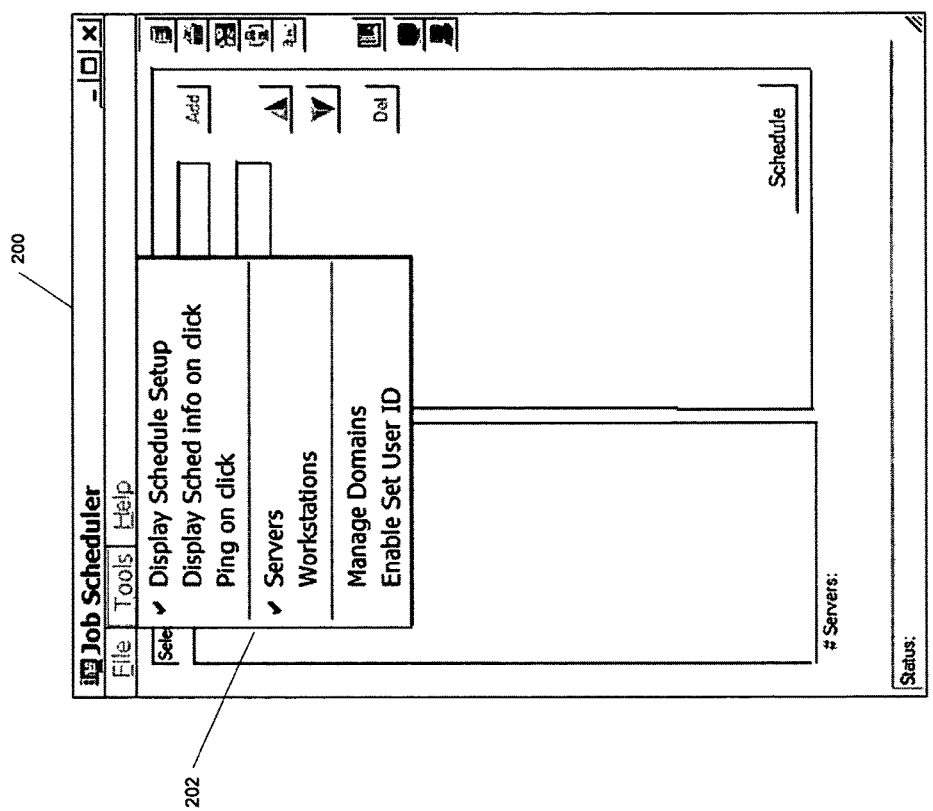
FIGS. 2A-2E illustrate exemplary user interfaces for setting up operation of the job scheduler.
Figure 2B:
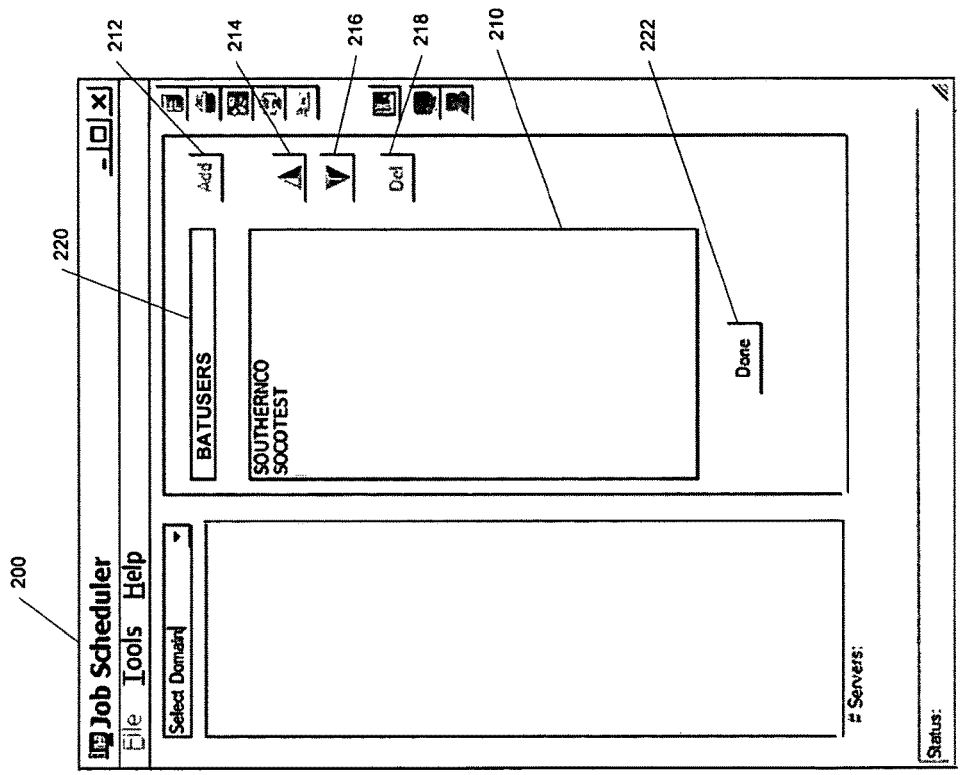
Figure 2C:
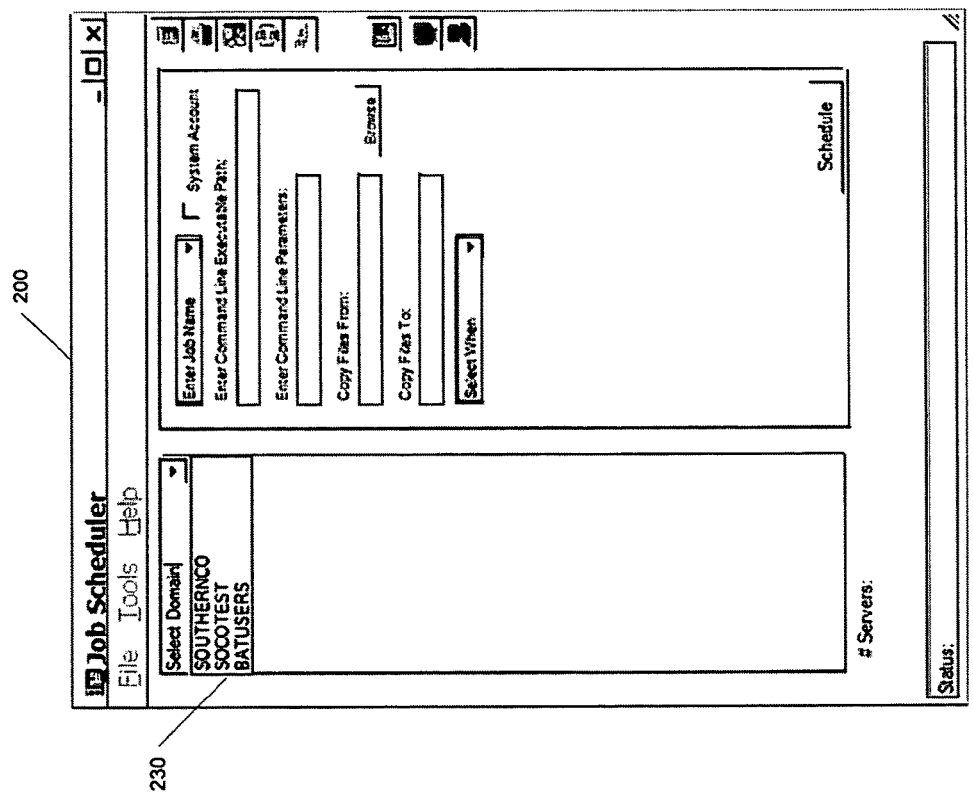
Figure 2D:
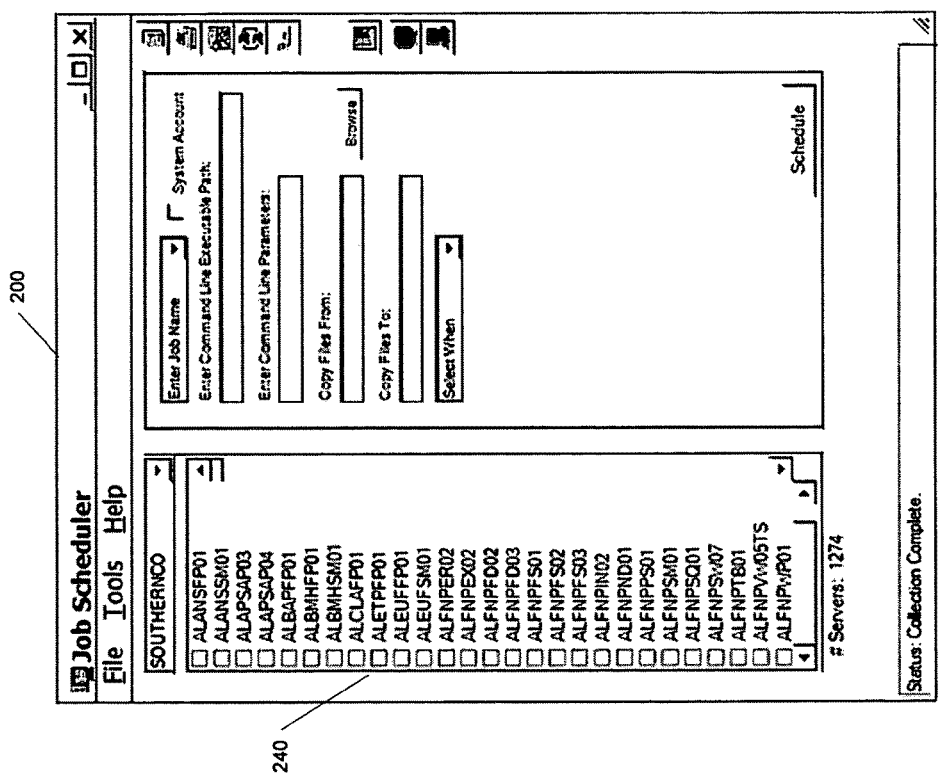

As illustrated in FIG. 2A, in order to input the list of domains the job scheduler will be using, the user goes to the job scheduler user interface "Tools" drop down menu 202 and selects "Manage Domains" function. This selection causes the appearance of the job scheduler user interface 200 to change to display a list of domains 210 as illustrated in FIG. 2B. This view gives the user the ability to input a domain on the top line 220 of the right window and click the "Add" key to include the selected domain in the domain list. If the user want to rearrange the ordering in the list of domains, the user selects the domain to move and clicks on the up or down arrows 214, 216 until it is in the desired place. In order to remove a domain from the list, the user highlights the domain to remove and clicks the "Del" key 218. Once the user completes domain selection and sequence, clicking "Done" 222 will make the selected domains available from the dropdown box 230 which reads "Select Domain" as illustrated in FIG. 2C. Once the user selects a domain, the tool will read the Active Directory of that domain and populate the machine list 240 with every machine known to the Active Directory as illustrated in FIG. 2D.

Figure 2E:
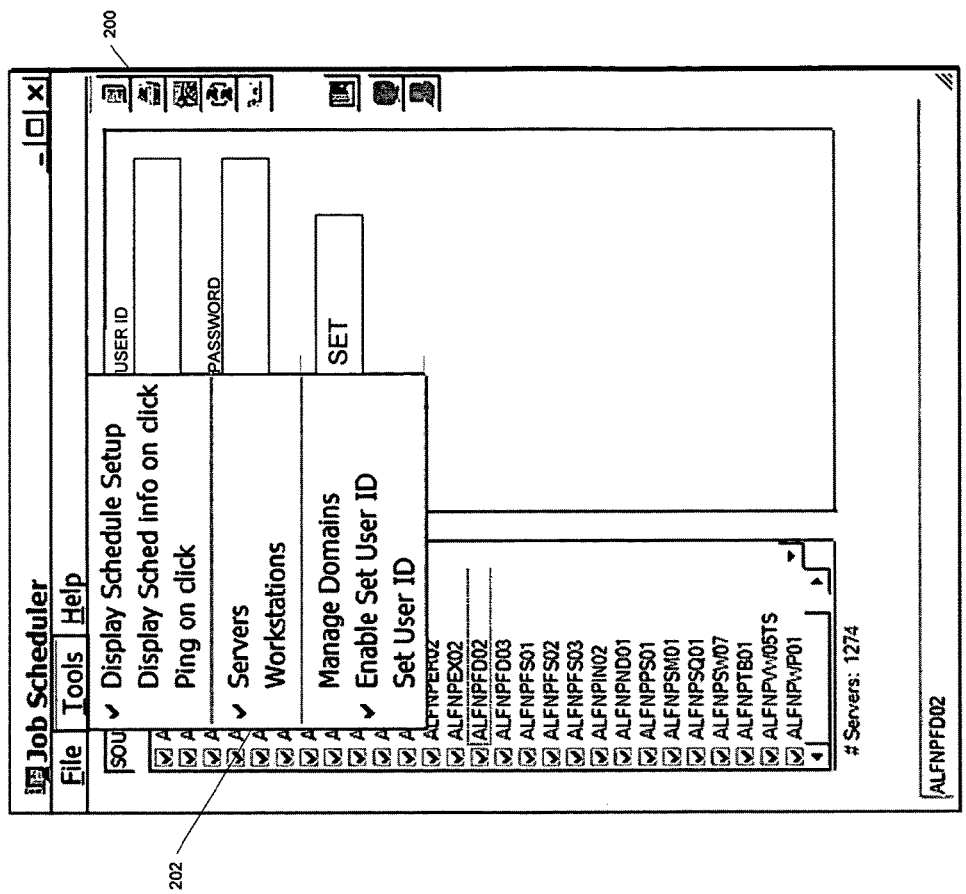

Although the job scheduler will normally operate using the built in system ID, the user may want to run a job which requires network access, e.g., to copy files, to write to a central log or any other job that requires network credentials. To add a network ID and password, the user selects the "Enable Set User ID" function from the "Tools" drop down menu 202 of the job scheduler user interface 200 as illustrated in FIG. 2E. The user enters the User ID and password into the corresponding fields and clicks the "Set" button.

FIG. 3 illustrates an exemplary configuration file 300 for storing a domain list 302 and each job 306, 308, 310 that is scheduled and deployed. The configuration file 300 is used by the job scheduler to store its configurable information. While the configuration file 300 is user configurable for the most part, some sections, such as the credentials section 304, are encrypted. Modifying the credentials section 304 even slightly will render the ID and password unusable. As illustrated in the exemplary configuration file of FIG. 3, the configuration file 300 stores the domain list 302 and every job 306, 308, 310 that is scheduled and deployed. The jobs depicted are disable NetIQ 306, save file shares 308 and printer queue backup 310. Each job indicates when the job will be executed. The jobs are stored so that the user needs to configure this file once and then run it as many times as preferred.

Figure 4:
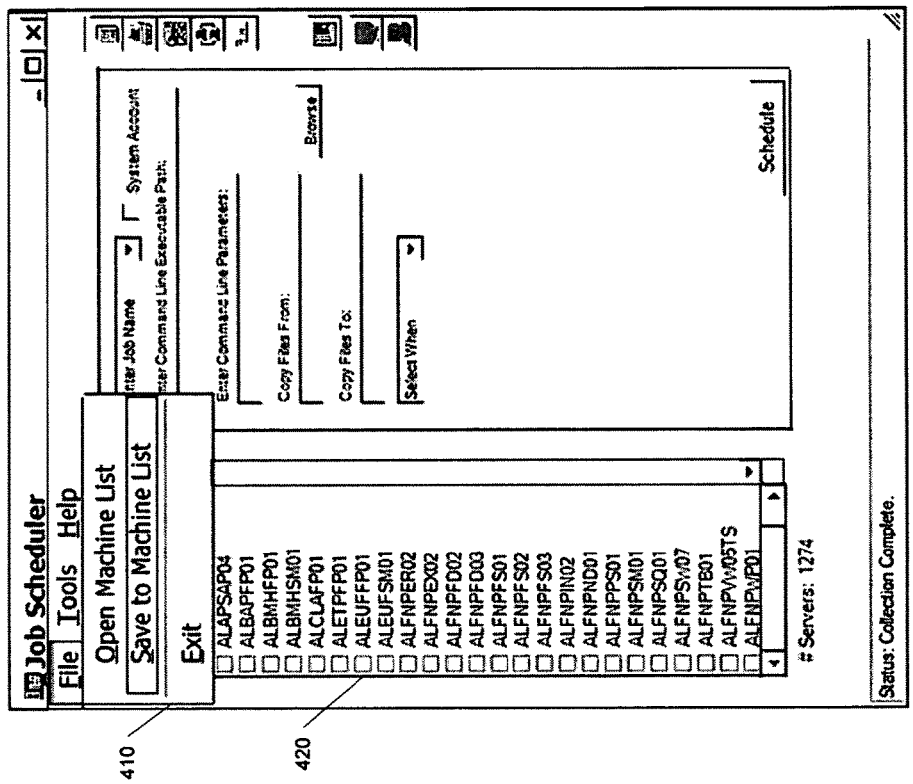
FIG. 4 illustrates an exemplary user interface displaying a list of machines that can be selected on which a task is to be run.

Although the job scheduler can pull every machine known on the network, the user will often prefer to work with a specific set of known machines. FIG. 4 illustrates an exemplary user interface displaying a "File" drop down menu 410 overlaying a list of machines 420 that can be selected on which a task is to be run. The term machines is used in a generic sense in this description to refer to computer systems including, but not limited to, servers and workstations.

Figure 5:
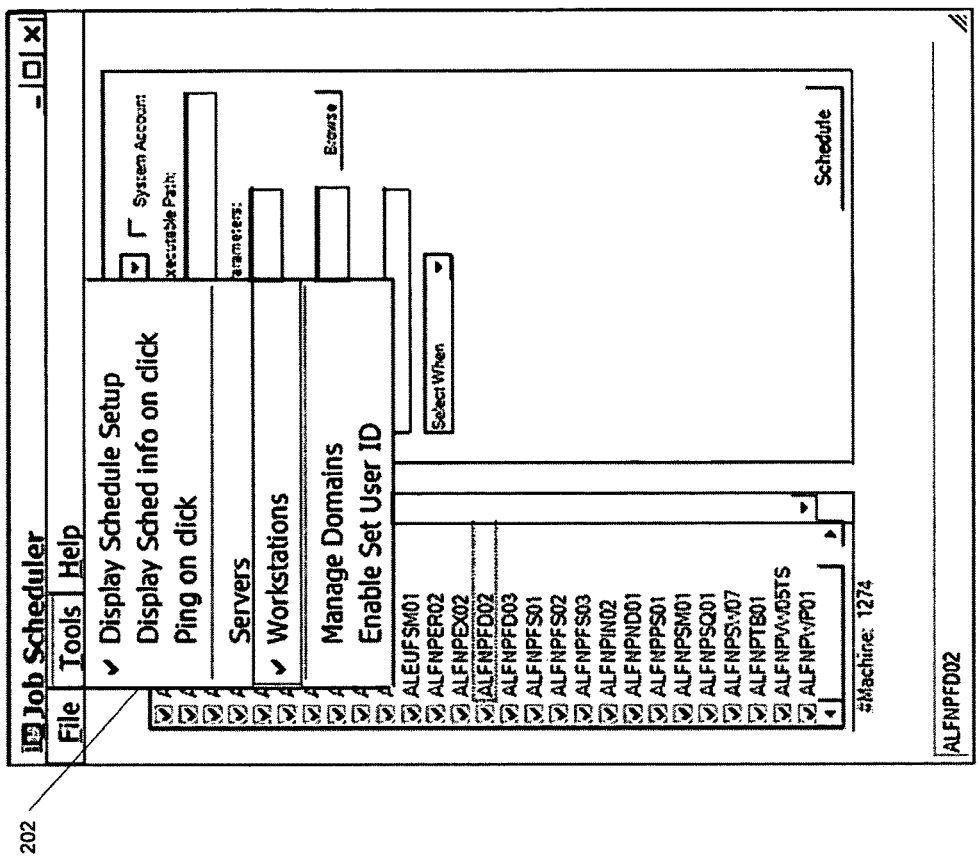
FIG. 5 illustrates an exemplary user interface tool bar drop down box for selecting servers or workstations for running a task.

When the job scheduler is first brought up, the list of computers (machines) is blank and the user can fill the list by selecting the domain that the user wants to work with, or by importing a list. As part of selecting a domain, the user can also select whether to work with servers or workstations. By default, the job scheduler will bring up a list of servers. The user can open the "Tools" drop down menu 202 on the job scheduler user interface 200 and select "Workstations" as shown in FIG. 5, and import a list of workstations. However, by selecting the default or "Servers" on the "Tools" drop down menu 202, the list will self-populate with servers once the user selects the domain.

Figure 6:
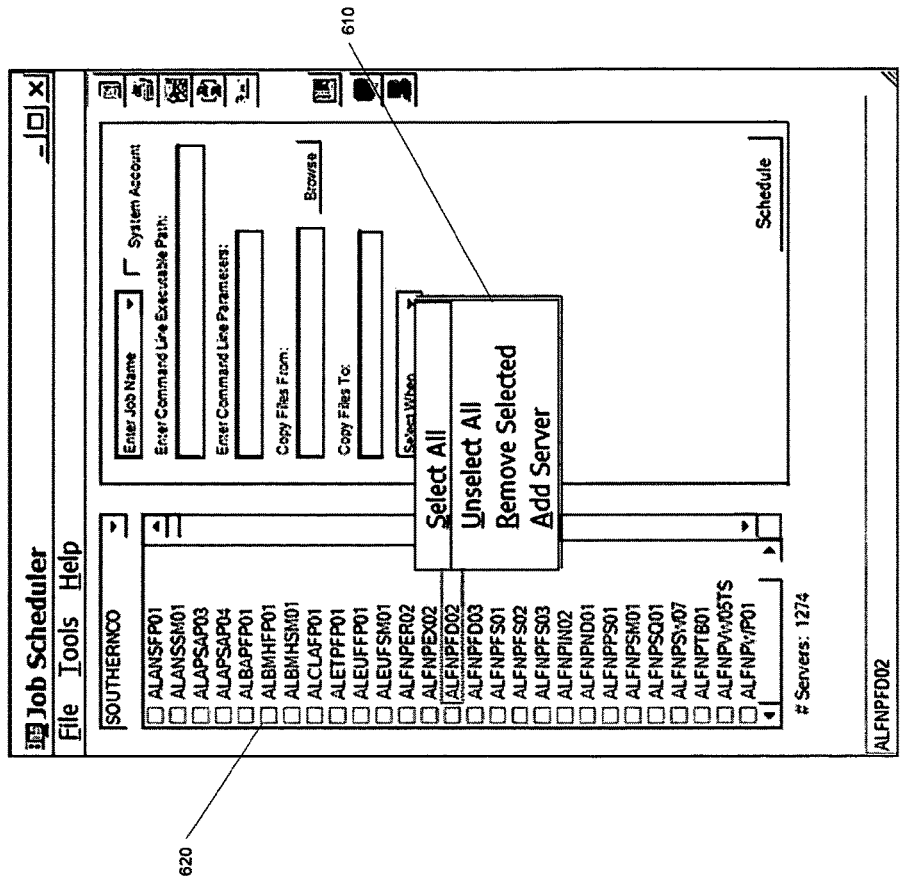
FIG. 6 illustrates an exemplary user interface displaying a list of machines that can be selected on which a task is to be run and a popup window for facilitating user selection.
Figure 7:
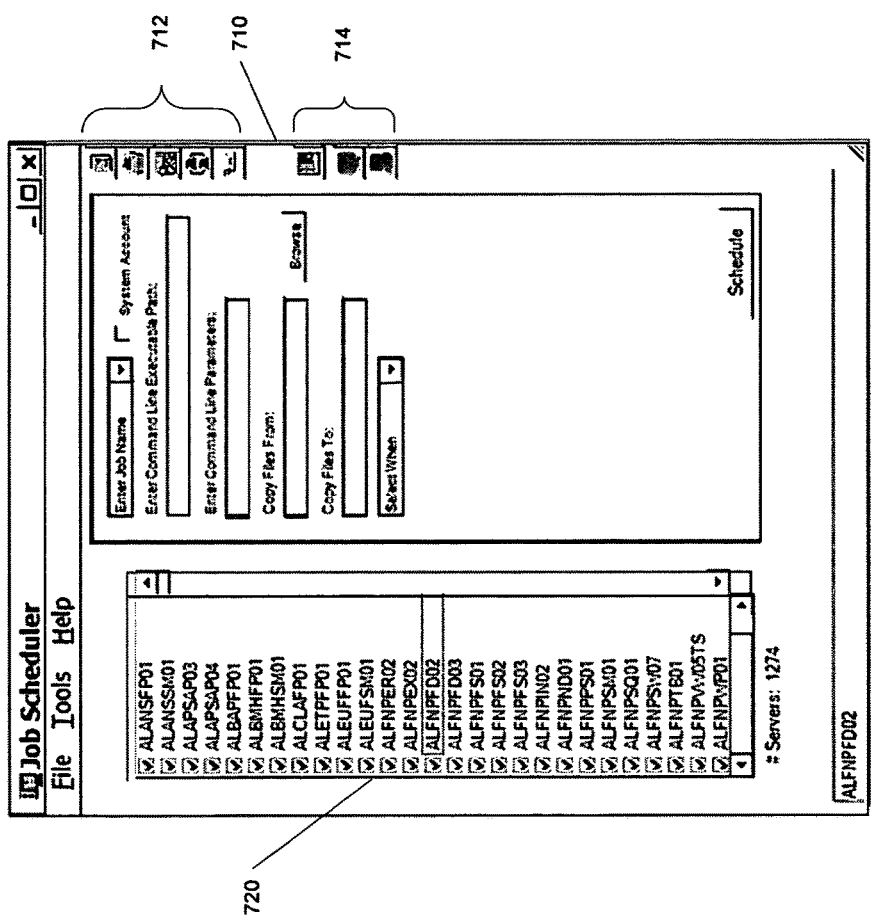
FIG. 7 illustrates an exemplary user interface displaying a list of machines that have been selected for running a task.

By right clicking on the machine list as exemplified in FIG. 4, the user will be presented with a popup menu 610, as depicted in FIG. 6, allowing selection, addition or removal of servers that are in the list of machines 620. If the user clicks "Select All" from the popup menu 610, a check will be placed automatically in the checkbox next to each machine in the list. FIG. 7 illustrates an exemplary job scheduler user interface 200 displaying a list of machines 720 that have been selected automatically for running a task.

The job scheduler can also filter computers based upon function or operating system platform (e.g., Windows 2000 or 2003). On the right hand side of the job scheduler user interface is a toolbar 710 with a set of icons. Each icon represents a type of server or an operating system. From top to bottom as illustrated in FIG. 7 and the previously described job scheduler interface displays, the icons 712 represent a file server, a print server, an application server, an infrastructure server and a mail server, respectively. When the user clicks on one of these icons, the server list will be filtered to display only those servers that match the functionality. For example, if the user clicks on the mail server icon, only servers that are associated with electronic mail functionality will be displayed in the list. This icon toolbar is representative only; there can be additional or fewer icons in other applications of the invention.

Figure 8:
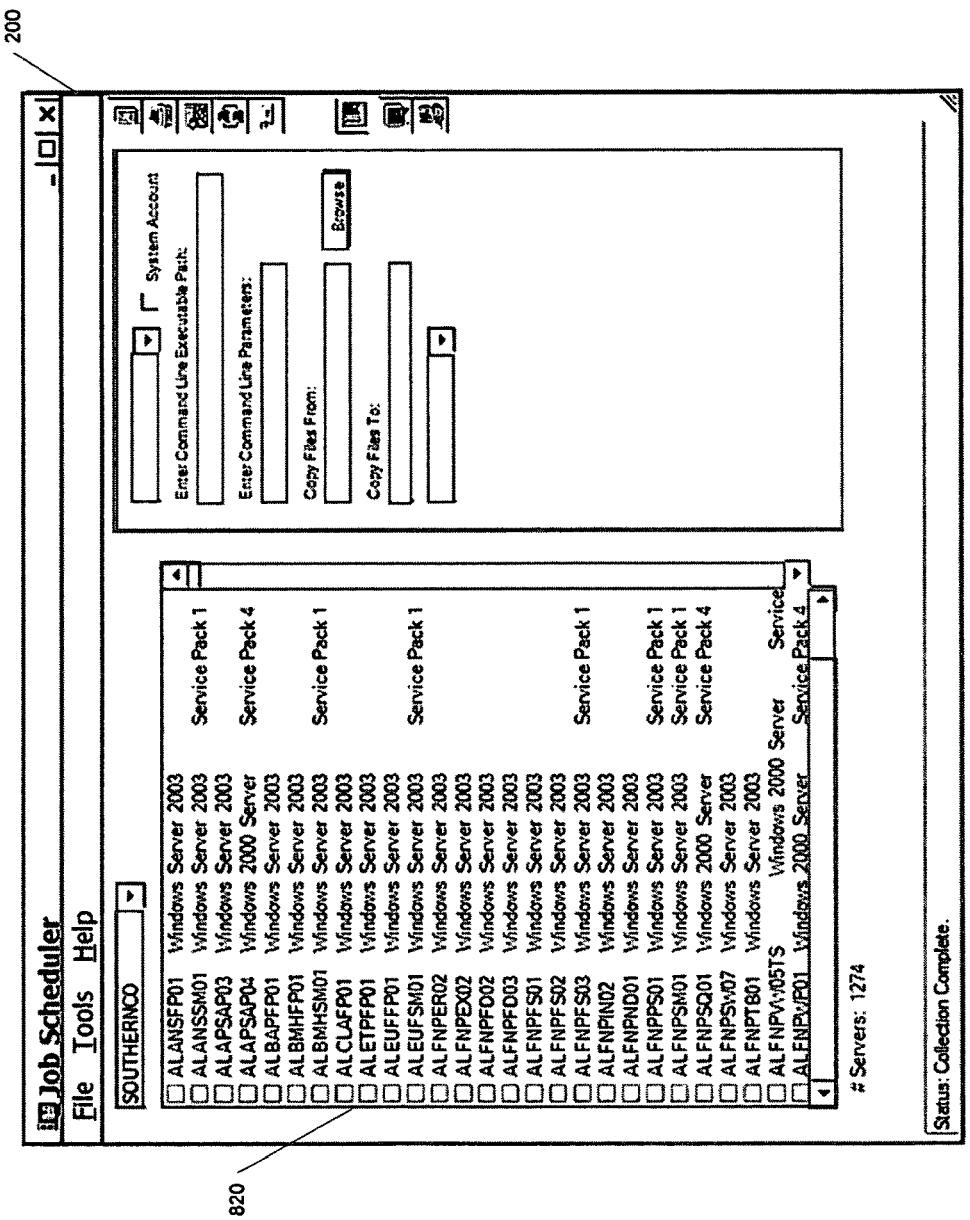
FIG. 8 illustrates an exemplary user interface that is populated with a list of server names and the operating system running on each server.

When the user clicks an operating system (OS) icon 714 on the tool bar 700 and reselects the domain, the job scheduler will populate the list with the server names, the associated operating systems (e.g., Windows 2000 or 2003) and, if applicable, the related service pack for the associated operating system. FIG. 8 illustrates an exemplary user interface that is populated with a list of server names 820 and the operating system running on each server.

Figure 9:
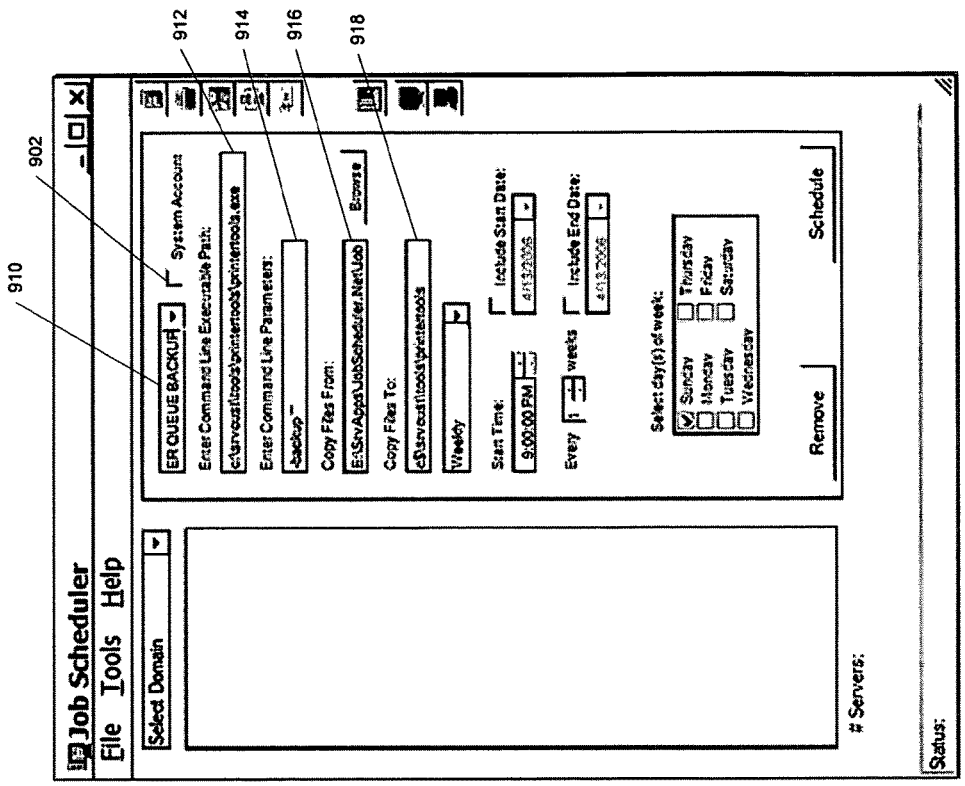
FIG. 9 illustrates an exemplary user interface for creating a job to run on machines in a specified domain.

FIG. 9 illustrates an exemplary user interface for creating a job to run on machines in a specified domain. In this example, the user names the job 910 and enters the path 912 on the remote computer to the location from which the executable file will be launched. The user also enters any arguments in command line parameters box 914 that need to be passed to the executable file. If the executable file, or other required files, are not already on the remote computer, the user provides the job scheduler with a path 916 to copy files from the local machine (or network connection) and a path 918 to the location where the files should be copied on the remote machine. The job scheduler will either copy the files if they do not exist, or update them, if necessary, on the remote machine. The user can then select a schedule as discussed further below.

If a network ID has been added to the tool, the job scheduler will use this ID and password to create the job on the individual machines. If a network ID has not been added, or if the "System Account" checkbox 902 is checked, the local system account will be used to process the jobs.

Figure 10:
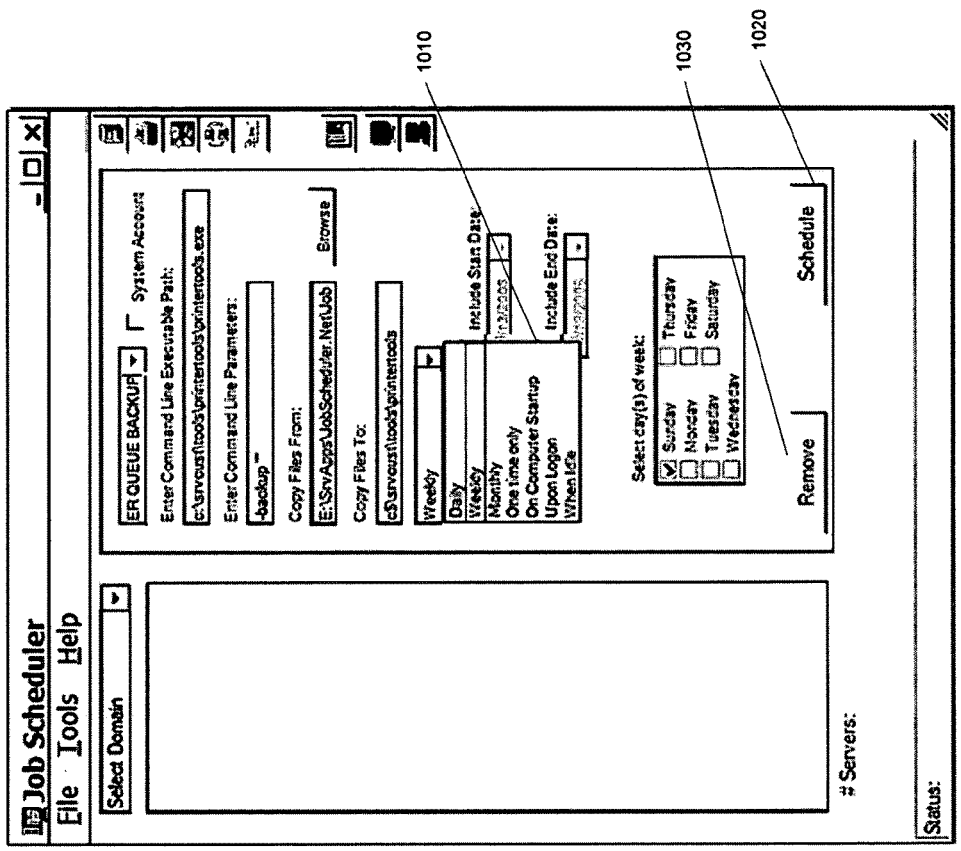
FIG. 10 illustrates an exemplary user interface with a drop down box for selecting when a job is to be scheduled for machines in a specified domain.

FIG. 10 illustrates an exemplary user interface with a drop down box 1010 for selecting when a job is to be scheduled for machines in a specified domain. What kind of schedule a job takes on is made by selecting an option from the drop down box. As shown in the drop down box 1010, the choices are "Daily", "Weekly", "Monthly", "One time only", "On Computer Startup", "Upon Logon" and "When Idle." The user will be presented with a different set of criteria based on the choice that is selected.

Figure 11:
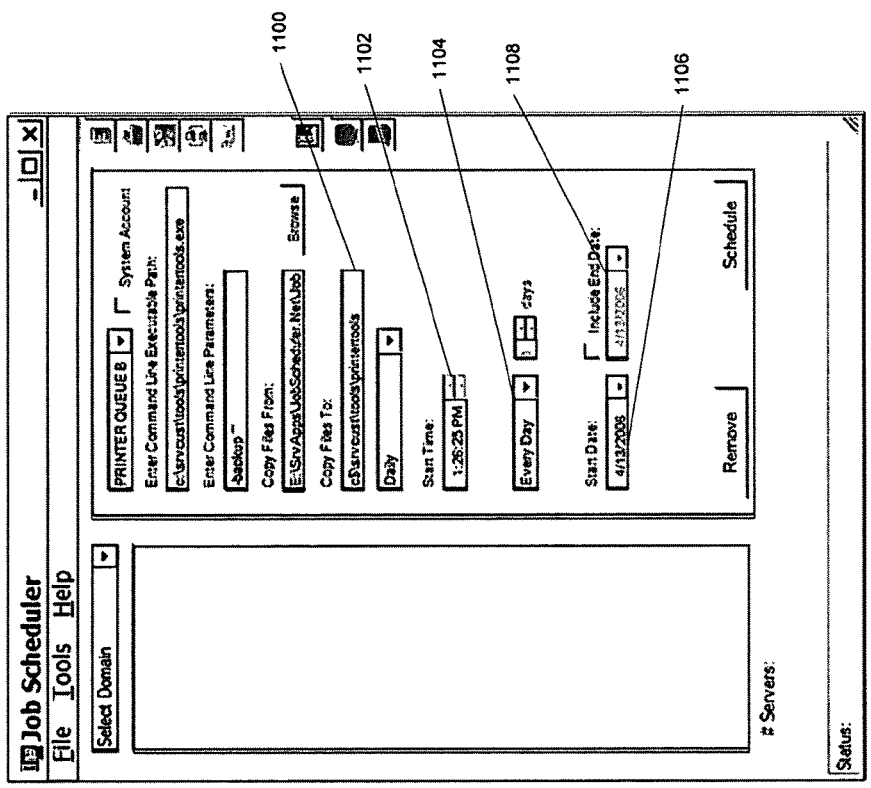
FIGS. 11-15 illustrate exemplary user interfaces with selectable criteria that are displayed depending on user selection of a schedule for when jobs are to be run on machines in a specified domain.

As illustrated in FIG. 11, selecting a daily schedule 1100 will provide the user with a combination box 1102 allowing the user to choose a start time. The user can also select from another drop down box 1104 whether to run every day, week days or every so many days selected by picking a number of days. Then the user can select a start date 1106 and, if desired, an end date 1108.

Figure 12:
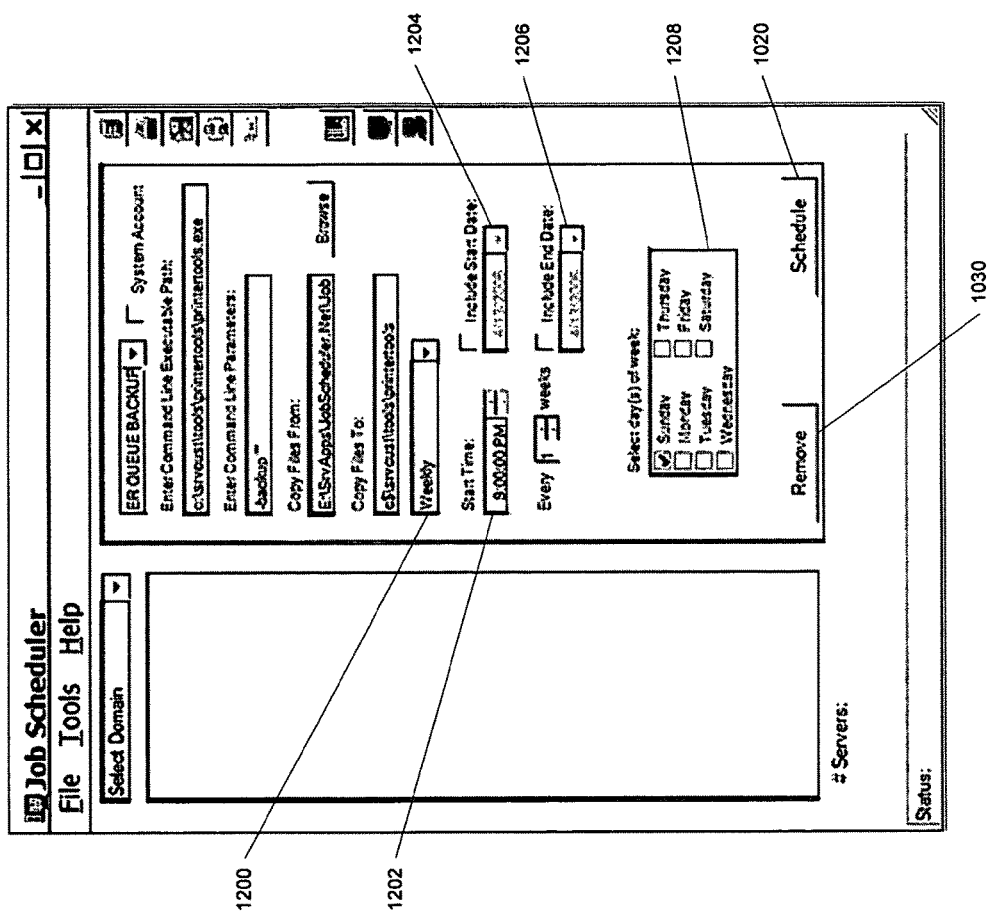

As illustrated in FIG. 12, selecting a weekly schedule 1200 will provide the user with the ability to select criteria such as start time 1202. The user can include a start date 1204 and/or an end date 1206, or the user can select to have the job run every so many weeks. The user can also select the day(s) of the week 1208 on which the job is to run.

Figure 13:
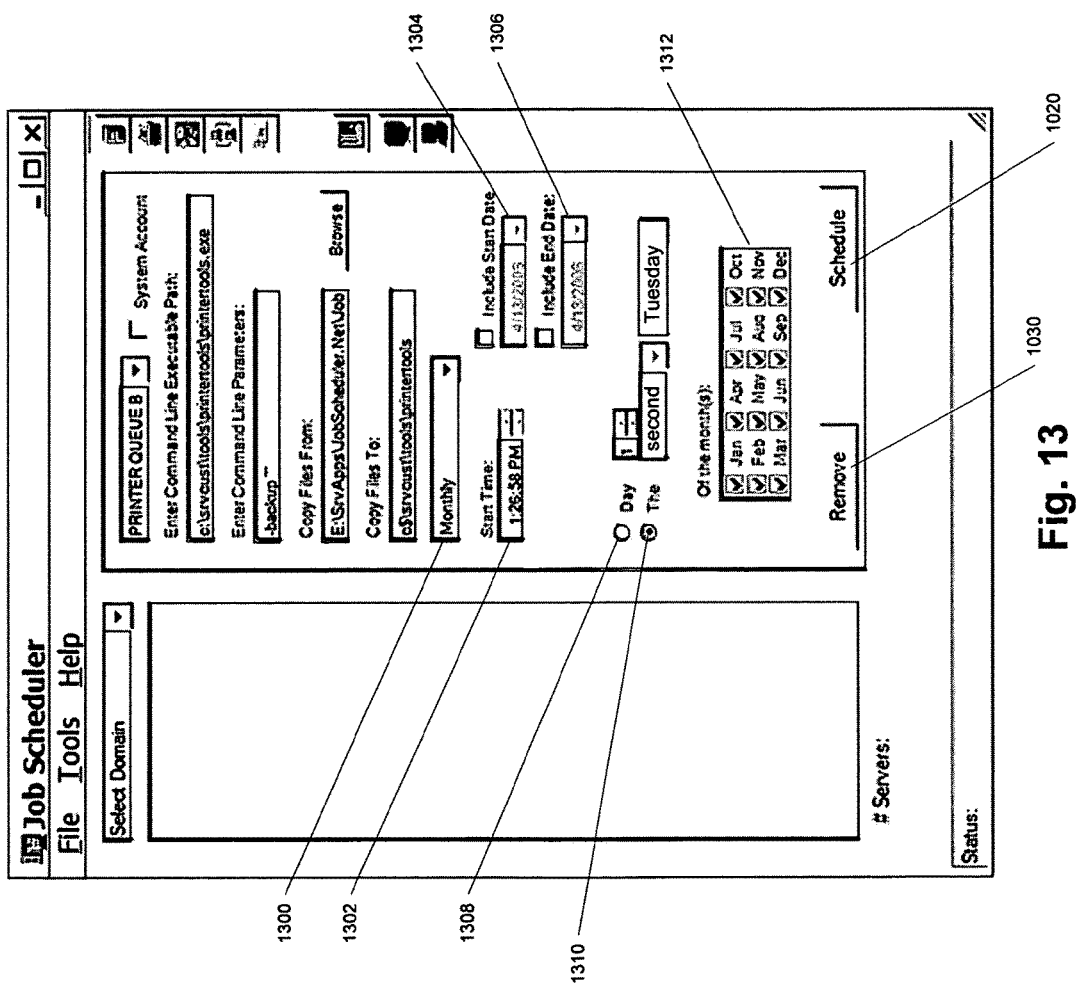

As illustrated in FIG. 13, selecting a monthly schedule 1300 will provide the user with the ability to select the start time 1302. The user can include the start date 1304 and/or end date 1306. The user can choose the day of the month 1308 to run the job, or can pick the first, second, third, forth or last Monday-Friday of the month 1310. The user can also select which months 1312 during the calendar year to run the job.

Figure 14:
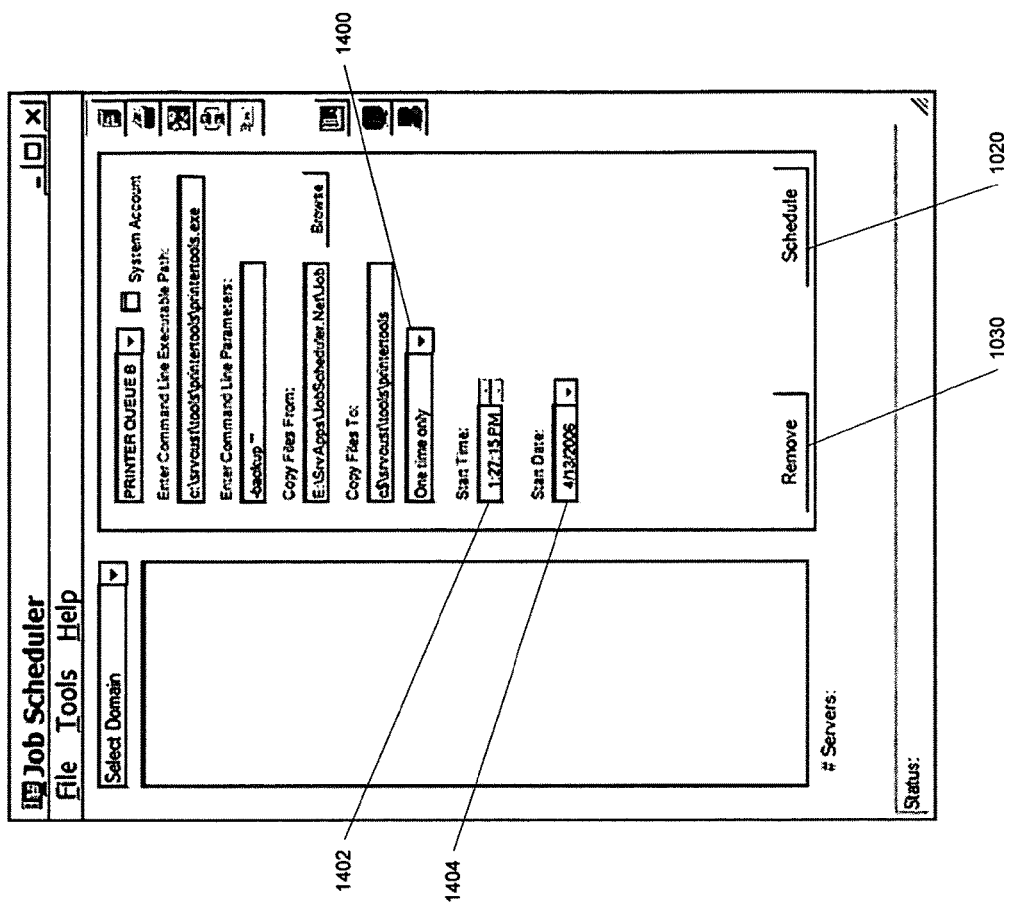

As illustrated in FIG. 14, selecting "one time only" 1400 will provide the user with the ability to select the start time 1402 and the start date. The job will run at that time and remove itself from the task scheduler on the machine.

Figure 15:
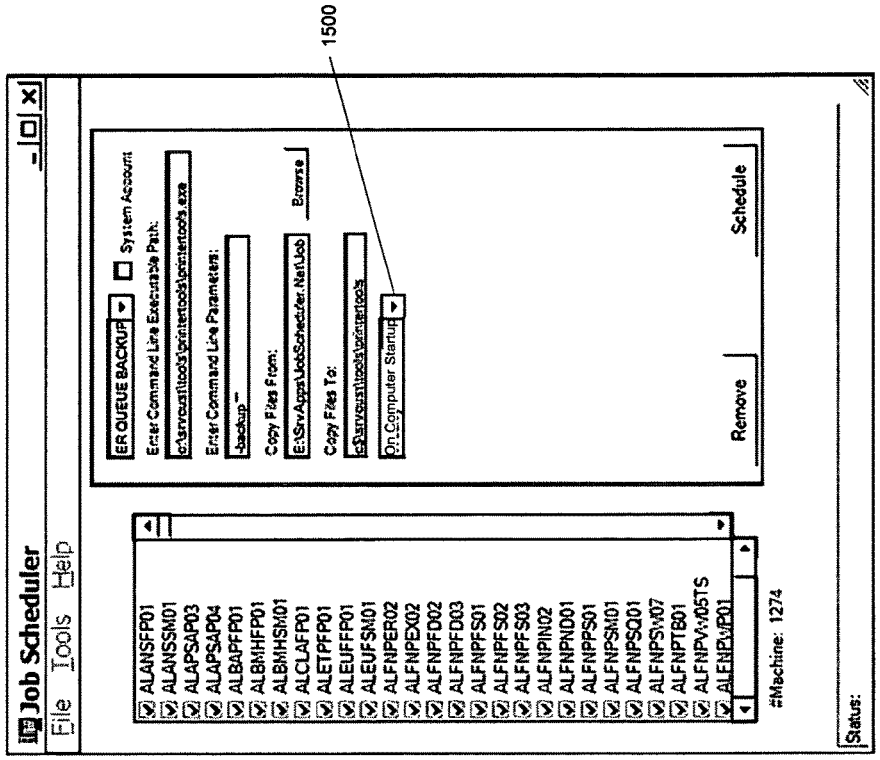

As illustrated in FIG. 15, selecting "on computer startup" 1500 has no other associated criteria. Selecting this option will cause the job to run in the background when the machine first reboots. The "upon logon" option (not shown) is similar to the "on computer startup" option, except that the job will only run the first time the user logs onto the computer. The "when idle" option (not shown) will cause the job to run on the computer when there is not much activity on the machine.

Once the user has completed all the job information and placed a checkbox in the list of machines that the user want the job to run on, clicking the "Schedule" button 1020 will result in the tool running through the machine list and place the job in the task scheduler of every machine selected. Also, if the job the user is creating already exists on a machine, when the job scheduler gets to that machine it will remove the existing job before it creates the new one as long as they have the same name.

Consequently, the task scheduler may place the job on servers/workstations that the user had no intention of doing. By selecting each such machine from the list of machines, and clicking the "Remove" button 1030, the job scheduler will go to each machine selected and remove the job if it exists.

The job scheduler is designed to provide security in placing jobs on machines in a domain. The job scheduler also keeps track of the user that is running this application. The log files are created with the name of the user who is logged onto the machine from which the job scheduler tool is being run. The job scheduler tool logs every activity that occurs as part of a scheduling process with the date-time stamp and the activities being performed. Successes and errors are also logged.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A method, comprising:
   creating a configuration file having stored therein a user ID and a source location of a job to be run by one or more of a plurality of computers;
   wherein creating the configuration file comprises determining a triggering criterion for each job to be executed on each computer; and
   transmitting the configuration file to respective task schedulers of the plurality of computers for installation and execution of the job.

2. The method of claim 1, further comprising:
   determining if the job already exists in the task schedulers on each of the plurality of computers; and
   removing the job from any task scheduler of the plurality of computers in which the job already exists.

3. The method of claim 1, further comprising selecting the computers from a generated list of computers on which the job is to run, wherein selecting the computers comprises filtering the generated list of computers based on a type of computer in the selected domain.

4. The method of claim 3, wherein the type of computer is a server or a workstation.

5. The method of claim 3, wherein the selecting the computers comprises filtering the generated list of computers based on a function performed by computers in the selected domain.

6. The method of claim 5, wherein the function performed by computers in the selected domain is selected from a group comprising at least one of: a file server, a print server, an application server, an infrastructure server and an electronic mail server.

7. The method of claim 3, wherein the selecting the computers comprises filtering the generated list of computers based on an associated operating system running on each computer in the selected domain.

8. The method of claim 1, wherein the triggering criterion is either event-based or time-based.

9. The method of claim 8, wherein the event-based triggering criterion causes the task schedulers to execute the job on the selected computers when a specific event occurs.

10. The method of claim 8, wherein a time-based triggering criterion is selected from a group comprising daily, weekly, monthly, and one time only.

11. The method of claim 8, wherein an event-based triggering criterion is selected from a group comprising upon logon and upon computer startup.

12. A computer program product stored on a non-transitory computer-readable storage medium having computer-readable code embedded therein, the computer-readable medium comprising:
program instructions that create a configuration file having stored therein a user ID and a source location of a job to be run by one or more of a plurality of computers;
wherein the program instructions that create the configuration file comprise program instructions that determine a triggering criterion for each job to be executed on each computer; and
program instructions that transmit the configuration file to respective task schedulers of the plurality of computers for installation and execution of the job.

13. The computer program product of claim 12 further comprising:
program instructions that determine if the job already exists in the task schedulers on each of the plurality of computers; and
program instructions that remove the job from any of the task schedulers of the plurality of computers in which the job already exists.

14. The computer program product of claim 12, further comprising program instructions that enable selection of the plurality of computers from a generated list of computers on which the job is to run, wherein the program instructions that enable selection of the computers comprise program instructions that filter the generated list of computers based on a type of computer in the selected domain.

15. The computer program product of claim 14, wherein the program instructions that enable selection of the computers comprise program instructions that filter the generated list of computers based on a function performed by computers in the selected domain.

16. The computer program product of claim 14, wherein the program instructions that enable selection of the computers comprise program instructions that filter the generated list of computers based on an associated operating system running on each computer in the selected domain.

17. The computer program product of claim 12, wherein the triggering criterion is either event-based or time-based.

18. The computer program product of claim 17, wherein the event-based triggering criterion causes the task schedulers to execute the job on the selected computers when a specific event occurs.

19. A system, comprising:
a processor; and
memory;
wherein the processor comprises:
a component that creates a configuration file having stored therein a user ID and a source location of a job to be run by one or more of a plurality of computers;
wherein the component that creates the configuration file comprises a module that determines a trigger criterion for each job to be executed on each computer; and
a component that transmits the configuration file to respective task schedulers of the plurality of computers for installation and execution of the job.

20. The system of claim 19, further comprising:
a component that determines if the job already exists in the task schedulers on each of the plurality of computers; and
a component that removes the job from any of the task schedulers of the plurality of computers in which the job already exists.

21. The system of claim 19, further comprising a component that enables selection of the plurality of computers from a generated list of computers on which the job is to run, wherein the component that enables selection of the computers filters the generated list based on a type of computer in the selected domain.

22. The system of claim 21, wherein the type of computer is a server or a workstation.

23. The system of claim 21, wherein the component that enables selection of the computers filters the generated list of computers based on a function performed by computers in the selected domain.

24. The system of claim 23, wherein the function performed by computers in the selected domain is selected from a group comprising at least one of a file server, a print server, an application server, an infrastructure server and an electronic mail server.

25. The system of claim 21, wherein the component that enables selection of the computers filters the generated list of computers based on an associated operating system that is run on each computer in the selected domain.

26. The system of claim 19, wherein the trigger criterion is either event-based or time-based.

27. The system of claim 26, wherein the event-based trigger criterion causes the task schedulers to execute the job on the selected computers when a specific event occurs.

* * * * *